UNITED STATES PATENT OFFICE.

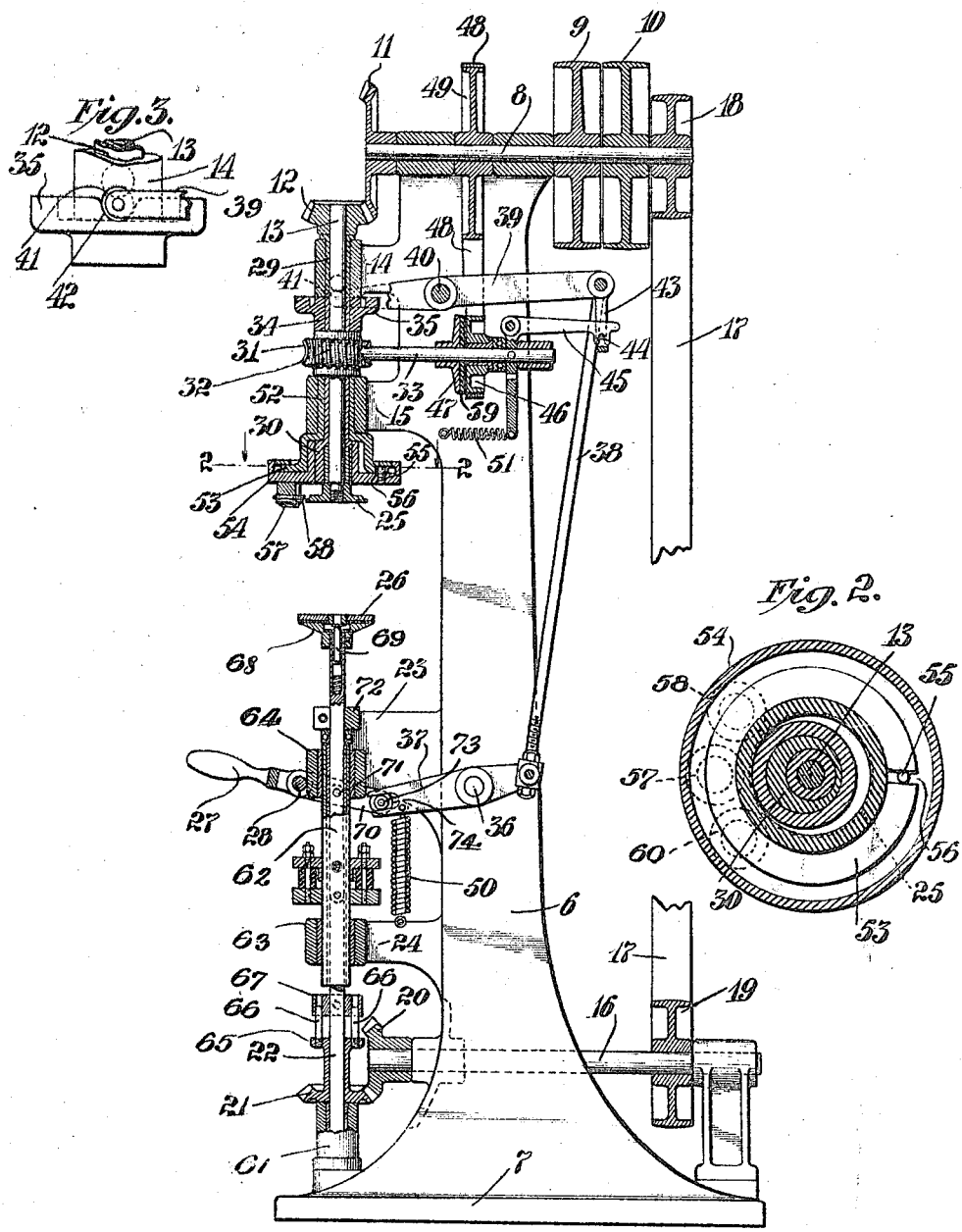

JULIUS BRENZINGER, OF MOUNT VERNON, NEW YORK, ASSIGNOR TO MAX AMS MACHINE COMPANY, OF MOUNT VERNON, NEW YORK, A CORPORATION OF NEW YORK.

CAN-HEADING MACHINE.

1,167,347.  Specification of Letters Patent.  Patented Jan. 4, 1916.

Application filed June 7, 1911. Serial No. 631,752.

*To all whom it may concern:*

Be it known that I, JULIUS BRENZINGER, a citizen of the United States, residing at Mount Vernon, in the county of Westchester and State of New York, have invented certain new and useful Improvements in Can-Heading Machines, of which the following is a specification.

This invention relates to machines for securing the heads or tops to the body portions of sheet metal containers, commonly known as tin cans, by what is known as the double seaming process.

In a co-pending application, filed July 5, 1910, Serial No. 570,343, I have shown and described a machine in which the can parts to be joined together were held in a stationary condition, the seaming operation being performed by seaming rollers which revolve around the can-parts to be joined and their supporting means at a high velocity. As stated in the application aforesaid, in double-seaming cans which have been filled with foodstuffs, which are generally sealed when the contents thereof are in a heated condition, it is considered desirable to perform the double-seaming operation by revolving the seaming rollers about the can and its supporting means, the latter being retained in a stationary condition in order that small portions of the hot contents of the can will not be thrown off by centrifugal forces before the sealing operation is completed. Nevertheless, machines of this character are necessarily more complicated and, particularly in the absence of automatic feeding and ejecting devices, slower in operation, than machines in which the can-parts are rotated by the chuck and the can-supporting platform and the seaming rollers merely brought into coöperation relative thereto.

This invention has for its principal object the adaptation of the features of construction and operation of the machine shown and described in my co-pending application aforesaid, to a machine in which the can is rotated during the seaming operation, whereby I am able to simplify both the construction and operation of machines of this character.

My invention will be more readily understood by reference to the accompanying drawings, forming a part of this specification, in which—

Figure 1 is a central sectional side elevation of a machine embodying my invention; Fig. 2 is an enlarged section taken substantially on the line 2—2 of Fig. 1, and Fig. 3 is a detailed view, in side elevation, of the cam through the medium of which the seaming rollers are checked in non-operative position.

Referring now to the drawings in detail, numeral 6 refers to a heavy supporting frame provided with the usual base 7. In the top of this frame is suitably journaled the main driving shaft 8 which carries the usual fast and loose pulleys 9 and 10 to which power is transmitted in the usual manner from any suitable source. At the end of the shaft 8 is provided the bevel gear 11, meshing with the bevel gear 12 on the vertical shaft 13 which is suitably journaled in the arms 14 and 15 projecting forwardly from the frame.

In the lower portion of the frame 6 is suitably journaled the shaft 16 driven from the shaft 8 by means of the belt 17 connecting the pulleys 18 and 19 and carrying at its forward end the bevel gear 20. Supported and having bearings in the sleeve or socket 61 on the base of the frame, and in the sleeve 62 which has slide bearings in the heads 63 and 64 at the end of the arms 24 and 23, respectively, is the vertical shaft 22. Loosely mounted on said shaft 22 and rotatively supported on the top of the sleeve or socket 61, is the bevel gear 21 in mesh with the gear 20 on the shaft 16. The gear 21 includes a disk 65, which is provided with a plurality of upwardly projecting pins 66 66 which enter suitable apertures in a disk or drum 67 fixed upon the shaft 22. It will be apparent that this construction and arrangement provides for the vertical reciprocation of the shaft 22 independent of rotation thereof through the intermeshed gears 20 and 21. These gears and the pulleys 18 and 19 are so proportioned that the shafts 13 and 22, which are in alinement, will be rotated in the same direction and at the same velocity.

At the top of the shaft 22 is fixed a flanged collar 68, the upper face of which provides a smooth flat surface upon which rests the disk or platform 26. This platform 26 is provided with a central pin or pivot 69 which projects into a suitable longitudinal bore in the upper end of the shaft 22, whereby said platform is held in place during rotation of the shaft 22. When the constantly rotating shaft 22 is in its most depressed or lowermost position, as it is designed to be when a can to be seamed is being positioned on the platform 26, said platform may be held against rotation in any desired manner—for instance, as fully shown and described in my co-pending application, filed February 15, 1908, Serial No. 416,001. As this platform is frictionally rotated, it will be apparent that as the shaft 22 is raised a little time will be required to overcome the inertia of said platform and the filled can thereon, whereby rotation thereof will be started gradually instead of abruptly.

The sleeve 62 is vertically reciprocated by means of an accessible and preferably yoke-shaped hand lever 27, fulcrumed at 28 to the head 64, the arms 70 of which are provided with slots into which project pins 71 on said sleeve 62 (a common and well-known construction) whereby, upon depression of the handle of the lever 27, the upper end of said sleeve will engage the collar 72 fixed on the shaft 22 and raise said shaft with the platform 26 at the upper end thereof.

At the lower end of the shaft 13 is mounted the chuck 25 which, as is well known, is adapted to enter a correspondingly shaped depression in the can-top or cover and support the latter against the forces of the seaming operation. When a can to be headed has been placed upon the platform 26, and the shaft 22 raised in the manner described, it will be seen that the can parts will be rapidly rotated at a constant velocity with the can-top firmly held in proper position for the seaming operation.

Fulcrumed at 36 to the frame of the machine is a lever 37, adapted to be oscillated by the lever 27, the end of one of the arms of the latter being provided with a pin 73 projecting into a slot 74 in the contiguous arm of the lever 37. To the other arm of said lever 37 is pivoted the connecting rod 38 similarly pivoted to the end of the lever 39 which is fulcrumed at 40 to the frame of the machine. The other end of the lever 39 is provided with a roller 41 which, in what may be termed its normal position, lies in a seat or pocket 42 in the upper face of a disk 35 which is fixed upon a sleeve 29 through the collar 34, thus checking rotation of said sleeve. From the operating end of the lever 39 projects downwardly the arm 43 which is provided with the pin 44 at the end thereof engaged by the end of the bell-crank lever 45. The other arm of this bell-crank lever is adapted, through the usual and well-known connections, to reciprocate the pulley 46 which is loose upon the shaft 33. This pulley 46 is provided with a friction disk 59 which coöperates with a friction disk 47 fixed upon the shaft 33, thus operating to drive the latter when sufficient pressure is exerted between the two friction surfaces in the manner of a simple friction clutch. A belt 48 connects the pulley 46 with the pulley 49 on the main driving shaft 8. The arms 70 of the lever 27 are held in depressed positions, and the roller 41, therefore, in the seat 42 in the disk 35, by means of the coil-spring 50, while a spring 51 tends to press the friction face of the pulley 46 against the friction disk 59 with sufficient force to make the clutch effective and drive the shaft 33.

The sleeve 29 is mounted on the shaft 13 to rotate independently thereof, and on this sleeve is mounted the gear 31 in mesh with the worm 32 at the end of the shaft 33, whereby said sleeve is rotated on the rotating shaft 13 in an opposite direction (although this is immaterial) at a very slow velocity. It will be seen, therefore, that when the lever 27 is depressed, in addition to raising the platform 26 to clamp the can parts between said platform and the chuck 25, the connecting rod 38 will be depressed, operating through the lever 39 to raise the roller 41 out of the seat or pocket 42 and thus permit rotation of the cam-disk 35 and therewith the sleeve 29. At the same time, the arm 43 is depressed, lowering the pin 44 and permitting movement of the bell-crank lever 45 under action of the spring 51 to make the friction clutch effective and rotate the sleeve 29 through the worm 32 and the gear 31.

The sleeve 29 terminates at its lower end in a circular eccentric head 30, and mounted in the forward end of the arm 15 is the fixed sleeve 52 which terminates at its lower end in an inverted cup shaped portion which has a flange or rim 53. This flange or rim 53 forms a support for the seaming-roller-carrying member 54, which has a cylindrical portion within which is journaled the eccentric head 30 at the lower end of the sleeve 29, and a disk-shaped portion the outer edge of which is upwardly and inwardly turned to form an internal annular groove the diameter of which is greater than the diameter of the flange 53, whereby said roller-carrying member 54 is supported by the edge of the flange or rim 53 and yet has a certain freedom of lateral movement therein. It will be apparent that this lateral movement is controlled and directed by rotation of the eccentric head 30, and the movement is further limited by a pin 55 in the member 54 projecting into a radially directed slot 56 in the flange or rim 53. The roller-carrying member 54, therefore, is thus held by the pin 55 against rotation but, under action of the rotating eccentric head 30, will be given movement which is the resultant of reciprocation in the general direction of the slot 56 and oscillation thereof about the pin 55 as a variable center.

The axles of the seaming rollers 57, 58 and 60 (of which the rollers 57 and 58 are shown in Fig. 1) are journaled in relatively fixed positions in the lower side of the carrying member 54. It is well known that ordinarily two rollers will suffice to perform the successive steps of the seaming operation, although under some conditions the employment of three rollers is preferable. While I have shown in the drawings a machine in which three seaming rollers are employed, it is to be understood that a machine having two rollers only or more than three rollers is within the scope of my invention. These rollers are of the usual construction and configuration and are provided with the usual peripheral grooves in their working edges, adapted to coöperate with the working edge of the chuck 25 in the usual manner to perform the seaming operation. It will be noted that all of these rollers are located on the same side of the member 54, relative to the shaft 13, and are in comparatively close proximity to each other.

It will be apparent that under normal conditions (as shown in Fig. 1) the chuck 25 is rotating at a substantially uniform velocity with the seaming rollers 57 and 58 held out of coöperative relation to the working edge of said chuck. The friction disk 47 being normally separated from the friction face of the pulley 46, there is no rotation of the shaft 33 and consequently of the gear 31. Therefore, the eccentric head 30 will remain at rest and there will be no movement of the seaming-roller-carrying member 54.

As explained, when the assembled parts of the can to be headed are placed upon the platform 26 and the lever 27 is depressed, these can parts will be raised and rotation will be gradually imparted thereto until the can parts are firmly gripped between the chuck 25 and the platform 26, and are being rapidly rotated with said chuck and platform. Furthermore, as explained, depression of the lever 27 operates to raise the roller 41 from its seat 42 in the cam disk 35, thus releasing the sleeve 29 for rotation, while at the same time the lever 45 is released for movement under the action of the spring 51 to bring the friction face of the pulley 46 into contact with the friction disk 47 and thus impart rotation to the shaft 33 and the form 32 to slowly rotate the gear 31 and therewith the sleeve 29 and the eccentric head 30.

I have found it best for all practical purposes that the eccentric head 30 should rotate once about its axis during fifteen rotations of the chuck 25. Rotation of this eccentric head within the carrier 54, which is held against rotation in the manner described, will subject said carrier to a bodily movement, clearly shown and described in my co-pending application, Serial No. 570,343, aforesaid, which will not only move all of said rollers to and from coöperative positional relationship to said chuck, but will insure independent action of each roller in succession throughout two or three rotations of said chuck, completing all of the steps of the seaming operation in from seven to nine rotations of said chuck, whereby, during from six to eight rotations thereof all of said rollers will have been withdrawn from coöperative positional relation thereto, therefore providing a sufficient clearance for a sufficient interval of time to remove a headed can and adjust on the platform 26 the assembled parts of the next succeeding can to be headed.

It is true that in my co-pending application Serial No. 570,343, aforesaid, the carrying member with its seaming rollers is being revolved around a stationary chuck at a comparatively high velocity and completes fifteen revolutions for each fourteen revolutions of the eccentric head 30 which, in that construction, is revolved much more rapidly than in the construction shown herein. However, the relative positions of the parts at any given instant of time, under the same general conditions, will be the same whether the roller-carrying member and the eccentric head are both rotating at slightly different velocities, or the carrying member is held against rotation and the eccentric head is rotated therein at a velocity which is equal to the difference between the velocities of the carrying member and the eccentric head where both are designed to rotate. Therefore, the "first operation" roller 60, the "second operation" roller 57, the "third operation" or compression roller 58 will be brought successively into engagement with the can top, which is supported by the chuck 25, in substantially the same manner as that clearly shown and described in my earlier application aforesaid.

It will be noted that rotation of the sleeve 29 will immediately follow the raising of the roller 41 from its seat 42 in the disk 35. Therefore, the lever 27 may be released immediately after depression thereof, the roller 41 now traveling along the smooth upper surface of said cam-disk 35 and all of the parts being thus held in operative positions until the rotating disk 35 again brings the seat 42 underneath said roller 41, whereupon said roller will at once be forced into said seat by action of the spring 50, releasing the shaft 33 and at once stopping rotation of the eccentric head 30. The sealed can will then be lowered with the platform 26 into position for removal and the placing on said platform of the assembled parts of another can for the next succeeding operation.

Attention is particularly directed to the fact that with the exception of the operations of placing the assembled parts of the unseamed can on the platform 26, depressing the lever 27, and removing the headed can, the operations of the machine herein shown and described are entirely automatic. The bearings of the seaming rollers are definitely and permanently fixed in the carrying member 54, and this carrying member, having its bearing upon the eccentric head 30, has at all times definitely established positional relations to the chuck 25, thus insuring a uniformity in operations and permitting a nicety of adjustment and a consequent higher degree of perfection in results which would be impossible when the seaming rollers are mounted at the extremities of arms the movements of which are controlled by or through their pivots. The chuck 25 being removably secured to the shaft 13, it will be apparent that in order to adjust my machine to cans of various sizes, it is only necessary to substitute a chuck, roller carrying head and platform of the proper proportions. Furthermore, it will be noted that rotation of the sleeve 29 and its eccentric head 30 are positively checked automatically with the rollers 57, 58 and 60 in their relative positions most remote from the chuck 25, whereby the seaming members are always in position to receive the can parts upon which they are designed to operate.

The more particular advantages claimed in connection with the present inventions are, first, its simplicity; second, the absence of a greater or less number of intermediate parts to insure movement of a certain character in any particular part; third, the elimination of a great deal of lost motion; fourth, the marked absence of cams and similar means of independently timing the movement of parts; fifth, the simplification of the problem of lubrication, and, sixth, the positiveness of the seaming operation and the ease of adjustment of the seaming parts, with absolute uniformity of effect throughout a long series of operations.

Many modifications of minor details of my improved can heading machine will doubtless readily suggest themselves to those skilled in the art to which it appertains; and I therefore do not limit my invention to the specific construction herein shown and described.

I claim as new and desire to secure by Letters Patent:

1. In a machine of the character described, the combination, with a circular eccentric, and a member concentrically mounted with respect to the axis of the eccentric, one of said elements being stationary and the other rotating, of a tool carrier journaled on said eccentric, and connecting means between said concentric member and said carrier to prevent relative rotation thereof and permit of relative lateral bodily movement of said carrier.

2. In a machine of the character described, the combination of a rotating circular eccentric, a tool carrier journaled thereon, a stationary member, and connecting means between said carrier and said member to hold the former against relative rotation with a freedom of lateral bodily movement.

3. In a machine of the character described, the combination, with a circular eccentric, and a member concentrically mounted with respect to the axis of the eccentric, one of said elements being stationary and the other rotating, of a tool carrier journaled on said eccentric and supported by said member for lateral bodily movement with relation thereto, and connecting means between said member and said carrier to hold the latter against relative rotation.

4. In a machine of the character described, the combination of a rotating circular eccentric, a tool carrier journaled thereon, a stationary member supporting said carrier for lateral bodily movement with relation thereto, and connecting means between said carrier and said member to hold the former against rotation.

5. In a machine of the character described, the combination, with a circular eccentric, and a member concentrically mounted with respect to the axis of the eccentric, one of said elements being stationary and the other rotating, of a tool carrier journaled on said eccentric, a plurality of tools on said carrier and all located on one side of said common axis, and connecting means between said concentric member and said carrier to prevent relative rotation thereof and permit of relative lateral bodily movement of said carrier.

6. In a machine of the character described, the combination, with a circular eccentric, and a member concentrically mounted with respect to the axis of the eccentric, one of said elements being stationary and the other rotating, of a tool carrier journaled on said eccentric and supported by said member for lateral bodily movement with relation thereto, a plurality of tools on said carrier and all located on one side of said common axis, and connecting means between said member and said carrier to hold the latter against relative rotation.

7. In a machine of the character described, the combination of a rotating circular eccentric, a tool carrier journaled thereon, a plurality of tools on said carrier and all located on one side of the axis of said carrier, a stationary member, and connecting means between said carrier and said member to hold the former against rotation with a freedom of lateral bodily movement.

8. In a machine of the character described, the combination of a rotating circular eccentric, a tool carrier journaled thereon, a stationary member supporting said carrier for lateral bodily movement with relation thereto, a plurality of tools on said carrier and all located on one side of the axis of said carrier, and connecting means between said carrier and said member to hold the former against rotation.

9. In a can heading machine, the combination, with means for supporting the assembled parts of the can to be headed, of a bearing block eccentrically disposed with reference to said can supporting means, a member mounted on said bearing block and held against rotation, a seaming roller carried by said member, and means for rotating said supporting means continuously and said bearing block intermittently.

10. In a can heading machine, the combination, with means for suitably supporting and rotating the assembled parts of the can to be headed, of a bearing block eccentrically disposed with reference to said supporting means, a member mounted on said bearing block and held against rotation, a plurality of seaming rollers carried by said member, and means for intermittently rotating said bearing block.

11. In a can heading machine, the combination, with a chuck rotating at a relatively high velocity, and an eccentric rotating at a relatively slow velocity, of a seaming-roller carrier journaled on said eccentric and held against rotation.

12. In a can heading machine, the combination, with a constantly rotating chuck, of an intermittently rotating eccentric and a seaming roller-carrier journaled on said eccentric and held against rotation.

13. In a can heading machine, the combination of a shaft, a chuck carried thereby, a sleeve on said shaft, an eccentric carried by said sleeve, a seaming-roller support journaled on said eccentric, a seaming roller carried by said support, means for rotating said shaft and said sleeve at essentially different velocities, and means for holding said support against rotation.

14. In a can heading machine, the combination of a shaft, a chuck carried thereby, a sleeve on said shaft, an eccentric carried by said sleeve, a seaming-roller support journaled on said eccentric, a seaming roller carried by said support, means for rotating said shaft and said sleeve at essentially different velocities, means for holding said support against rotation, and manually releasable means for checking rotation of said sleeve at the completion of each rotation thereof.

15. In a cam heading machine, the combination of a shaft, a chuck carried thereby, a sleeve on said shaft, an eccentric carried by said sleeve, a seaming-roller support journaled on said eccentric, a seaming roller carried by said support, means for rotating said shaft continuously and said sleeve intermittently at essentially different velocities, and means for holding said support against rotation.

16. In a can heading machine, the combination of a rotating shaft, a chuck carried thereby, a rotatable and vertically movable platform adapted to coöperate with said chuck and engage and rotate the assembled parts of the can to be headed, means for raising and lowering said platform, a normally stationary sleeve on said shaft, an eccentric head carried by said sleeve, a seaming roller support journaled on said eccentric head, a seaming roller carried by said support, means actuated by the platform actuating means through the medium of which said sleeve is rotated, and means for holding said support against rotation.

17. In a can heading machine, the combination, with a rotating shaft having both a rotating and a stationary sleeve thereon, of a work support mounted on said shaft, and a tool carrier having a plurality of tools thereon and a tool-carrier actuating member mounted on said sleeves, and means for interconnecting said support, carrier and member to repeatedly move said tools in regular succession to and from work-engaging positions.

18. In a can heading machine, the combination, with a shaft having two superposed sleeves thereon, and means for rotating said shaft and one of said sleeves at essentially different velocities, of a work support mounted on said shaft and a tool carrier having a tool thereon and a tool-carrier actuating member mounted on said sleeves, and means for interconnecting said support, carrier and member to repeatedly move said tool to and from work-engaging position.

19. In a can heading machine, the combination, with a shaft having two superposed sleeves thereon, and means for rotating said shaft and one of said sleeves at essentially different velocities, of a work support mounted on said shaft, and a tool carrier having a plurality of tools thereon and a tool-carrier actuating member mounted on said sleeves, and means for interconnecting said support, carrier and member to repeatedly move said tools in regular succession to and from work-engaging positions.

20. In a can heading machine, the combination, with a rotating shaft having both a rotating and a stationary sleeve thereon, said shaft carrying a work support, said stationary sleeve carrying a tool carrier having a tool thereon and said rotating shaft carrying a member for actuating said tool carrier, of means for interconnecting said support, carrier and member to repeatedly move said tool to and from work-engaging position.

21. In a can heading machine, the combination, with a rotating shaft having both a rotating and a stationary sleeve thereon, said shaft carrying a work support, said stationary sleeve carrying a tool carrier having a plurality of tools thereon and said rotating shaft carrying a member for actuating said tool carrier, of means for interconnecting said support, carrier and member to repeatedly move said tools in regular succession to and from work-engaging positions.

22. In a can heading machine, the combination, with a shaft having two superposed sleeves thereon, and means for rotating said shaft and one of said sleeves at essentially different velocities, said shaft carrying a work support, said stationary sleeve carrying a tool carrier having a tool thereon and said rotating shaft carrying an actuating member for said tool carrier, of means for interconnecting said support, carrier and member to repeatedly move said tool to and from work-engaging position.

23. In a can heading machine, the combination, with a shaft having two superposed sleeves thereon, and means for rotating said shaft and one of said sleeves at essentially different velocities, said shaft carrying a work support, said stationary sleeve carrying a tool carrier having a plurality of tools thereon, and said rotating shaft carrying an actuating member for said tool carrier, of means for interconnecting said support, carrier and member to repeatedly move said tools in regular succession to and from work-engaging positions.

24. In a can heading machine, the combination. with a shaft having two superposed sleeves thereon, and means for rotating said shaft continuously and one of said sleeves intermittently, of a work support mounted on said shaft, a tool carrier having a tool thereon and a tool-carrier actuating member mounted on said sleeves, and means for interconnecting said support, carrier and member to move said tool to and from work-engaging position during intermittent movement of the rotating sleeve.

25. In a can heading machine, the combination, with a shaft having two superposed sleeves thereon, and means for rotating said shaft continuously and one of said sleeves intermittently, of a work support mounted on said shaft, a tool carrier having a plurality of tools thereon and a tool-carrier actuating member mounted on said sleeves, and means for interconnecting said support, carrier and member to move said tools in regular succession to and from work-engaging positions during intermittent movement of the rotating sleeve.

26. In a can heading machine, the combination, with a shaft having two superposed sleeves thereon and means for rotating said shaft continuously and one of said sleeves intermittently, said shaft carrying a work support, the stationary sleeve carrying a tool carrier having a tool thereon, and said intermittently rotating shaft carrying an actuating member for said tool carrier, of means for interconnecting said support, carrier and member to move said tool to and from work-engaging position during intermittent movement of the rotating sleeve.

27. In a can heading machine, the combination, with a shaft having two superposed sleeves thereon and means for rotating said shaft continuously and one of said sleeves intermittently, said shaft carrying a work support, the stationary sleeve carrying a tool carrier having a plurality of tools thereon, and said intermittently rotating shaft carrying an actuating member for said tool carrier, of means for interconnecting said support, carrier and member to move said tools in regular succession to and from work-engaging positions during intermittent movement of the rotating sleeve.

28. In a can heading machine, the combination of a rotating chuck, a rotatable and vertically movable platform adapted to coöperate with said chuck to support and rotate the assembled parts of the can to be headed, means for raising and lowering said platform, a circular head eccentrically mounted with respect to said chuck, a tool carrier journaled on said head, a seaming tool mounted on said carrier, means for rotating said chuck and said head at essentially different velocities, means for holding said carrier against rotation with said head, a clutch interposed in said head rotating means, and means actuated by the platform actuating means through the medium of which said clutch is rendered operative.

29. In a can heading machine, the combination of a rotating chuck, a rotatable and vertically movable platform adapted to coöperate with said chuck to support and rotate the assembled parts of the can to be headed, means for raising and lowering said platform, a circular head eccentrically mounted with respect to said chuck, a tool carrier journaled on said head, a seaming tool mounted on said carrier, means for rotating said chuck and said head at essentially different velocities, means for holding said carrier against rotation with said head, a clutch interposed in said head rotating means, a spring retaining the clutch members in a normally disjoined condition, and means actuated by the platform actuating means through the medium of which said clutch members are connected.

30. In a can heading machine, the combination, of a rotating chuck, a rotatable and vertically movable platform adapted to coöperate with said chuck to support and rotate the assembled parts of the can to be headed, means for raising and lowering said platform, a circular head eccentrically mounted with respect to said chuck, a tool carrier journaled on said head and having a seaming tool thereon, means comprising disconnected elements capable of being joined to actuate said carrier to advance and retract said tool into and from work-engaging position, releasable means checking movement of said head when said tool is out of work-engaging position, and means having common connection with said platform actuating means to unite said carrier actuating means and simultaneously release said checking means.

In testimony of the foregoing, I have hereunto set my hand in the presence of two witnesses.

JULIUS BRENZINGER.

Witnesses:
W. L. MANN,
GEORGE GEHRUNG.

Copies of this patent may be obtained for five cents each, by addressing the "Commissioner of Patents, Washington, D. C."